United States Patent
Chen et al.

(10) Patent No.: US 6,728,916 B2
(45) Date of Patent: Apr. 27, 2004

(54) HIERARCHICAL BUILT-IN SELF-TEST FOR SYSTEM-ON-CHIP DESIGN

(75) Inventors: Howard H. Chen, Yorktown Heights, NY (US); Louis L. Hsu, Fishkill, NY (US); Li-Kong Wang, Montvale, NJ (US)

(73) Assignee: International Business Machines Corporation, Armonk, NY (US)

(*) Notice: Subject to any disclaimer, the term of this patent is extended or adjusted under 35 U.S.C. 154(b) by 379 days.

(21) Appl. No.: 09/863,952

(22) Filed: May 23, 2001

(65) Prior Publication Data

US 2002/0178416 A1 Nov. 28, 2002

(51) Int. Cl.[7] .............................................. G01R 31/28
(52) U.S. Cl. ........................................ 714/733; 714/724
(58) Field of Search ................................ 714/727, 741, 714/738, 733, 724; 345/504; 395/500.19

(56) References Cited

U.S. PATENT DOCUMENTS

| | | | | |
|---|---|---|---|---|
| 5,862,152 A | * | 1/1999 | Handly et al. | ............... 714/727 |
| 5,983,009 A | * | 11/1999 | Lepejian et al. | ........ 395/500.19 |
| 6,008,821 A | * | 12/1999 | Bright et al. | ................ 345/504 |
| 6,044,481 A | | 3/2000 | Kornachuk et al. | |
| 6,249,893 B1 | * | 6/2001 | Rajsuman et al. | ........... 714/741 |
| 6,408,413 B1 | * | 6/2002 | Whetsel | ....................... 714/727 |
| 6,505,317 B1 | * | 1/2003 | Smith et al. | ................. 714/738 |

OTHER PUBLICATIONS

J. Dreibelbis et al., "Processor–Based Built–In Self–Test for Embedded DRAM", IEEE Journal of Solid State Circuits, vol. 33, No. 11, Nov. 1998, pp. 1731–1739.

* cited by examiner

Primary Examiner—David Ton
(74) Attorney, Agent, or Firm—Ference & Associates

(57) ABSTRACT

Hierarchical built-in self-test methods and arrangement for verifying system functionality. As a result, an effective built-in self-test methodology is provided for conducting complete system-on-chip testing, to ensure both the circuit reliability and performance of system-on-chip design. As an added advantage, development costs are reduced for system-on-chip applications.

37 Claims, 3 Drawing Sheets

HIERARCHICAL BUILT-IN SELF-TEST FOR SYSTEM-ON-CHIP DESIGN

FIELD OF THE INVENTION

The present invention relates generally to built-in-self-test design in and for computer chips.

BACKGROUND OF THE INVENTION

Built-in self-test (BIST) design has been commonly implemented in memory and microprocessor chips. Some BIST designs are used only once during wafer-level or module-level testing to screen out bad chips. Other BIST designs are used to conduct self-checking and repairing after each power-on, throughout the lifetime of the chip. In today's high-density, high-performance chip design, BIST has become a critical circuit component that determines the product's development cost and time to market.

A typical BIST circuit in a high-density dynamic random access memory (DRAM) includes a controller, cache, pattern generator, and data comparator. (For instance, see Jeffery Dreibelbis, et al, "Processor-Based Built-In Self-Test for Embedded DRAM", IEEE Journal of Solid State Circuits, Vol. 33, No. 11, November 1988, pp. 1731–1739.) The controller uses signal bits to communicate with an external tester. Different test modes such as START, STOP, CONTINUE, REFRESH, READ, and WRITE can be carried out by programming the signal bits. Typically, the cache can store 256 20-bit instruction words in multiple programs. After the chip is powered on, the cache will be loaded with a set of test programs, which determines how the DRAM will be tested. The pattern generator is capable of generating common test patterns such as solid '1', solid '0', checkerboard, row stripe, column stripe, and march pattern. The data comparator compares the data read from DRAM with the expected data that are written to DRAM, and determines whether the circuit passes or fails the test.

A more detailed analysis can be performed during wafer burn-in or module burn-in. After scanning each row and column of the DRAM array, a built-in address stack register array will store the addresses with the highest fail counts. These addresses will be used for repairing by activating redundancies via fuse programming techniques.

By placing many different macros on a single chip, a system-on-chip (SOC) design takes full advantage of the integration technique to achieve multi-function operations. For example, a wireless communication chip may comprise an embedded DRAM memory macro, a Flash memory macro, a microprocessor core, a mixed signal macro, and some analog macros. One of the challenges of designing a complicated system chip is to verify its design. However, since most input and output pins of each macro become inaccessible after integration, it is difficult to conduct a reliable high-speed and low-cost testing of a system chip.

Since most existing built-in self-test circuits are tailored to the individual macros, the BIST design for single memory or processor chips cannot be applied to the system chip that includes both the memory and processor macros. The BIST design for memory testing cannot be used directly for processor testing, and vice versa. In addition, there is no known BIST design for analog, radio frequency (RF), and mixed signal macros. The lack of communication and coordination among the tests of different macros will further compound the complexity of the problem.

Accordingly, a need has been recognized in connection with providing an effective built-in self-test methodology to conduct the complete system-on-chip testing, to ensure the circuit reliability and performance of system-on-chip design.

SUMMARY OF THE INVENTION

In accordance with at least one presently preferred embodiment of the present invention, a hierarchical built-in self-test (BIST) design method is provided for testing an integrated system chip with various functional blocks and macros.

The present invention also broadly contemplates, in accordance with at least one embodiment, the provision of a central BIST controller, one or more local BIST circuits for each macro, and data/control paths to perform the system on chip (SOC) test operations.

Further contemplated herein is the provision of a hierarchical test methodology that allows various levels (or more than one level) of testing on different macros. For example, the highest level of testing detects each macro's faults that are not reparable. The next level of testing detects the macro interface's faults that are not reparable. The following levels of testing may include self-repairing, self-tuning, and parameter adjustment for each macro to ensure its performance and functionality. The last level of testing conducts interface debugging and yield analysis, and sends reports to the external tester.

In accordance with at least one presently preferred embodiment of the present invention, a central BIST controller comprises: programmable devices for storing the test patterns and programming the test commands for each macro; a state machine for executing the test sequence for each macro in an orderly manner; a dynamic random access memory (DRAM) for collecting the feedback data from the local BIST circuits; and a built-in processor for conducting intra-macro and inter-macro testing via programs from an external tester.

Additionally contemplated herein is the provision of a test algorithm that performs self-testing and sets stopping criteria in a hierarchical and parallel manner to reduce the total test time.

In summary, one aspect of the invention provides an apparatus for providing hierarchical built-in self-testing for a system-on-chip, the apparatus comprising: a central BIST controller; at least one local BIST circuit; and at least one communication medium provided between the central BIST controller and the at least one local BIST circuit.

Another aspect of the invention provides a method of providing hierarchical built-in self-testing for a system-on-chip, the method comprising the steps of: providing a central BIST controller; providing at least one local BIST circuit; and communicating between the central BIST controller and the at least one local BIST circuit.

Furthermore, another aspect of the invention provides a program storage device readable by machine, tangibly embodying a program of instructions executable by the machine to perform method steps for providing hierarchical built-in self-testing for a system-on-chip, the method comprising the steps of: providing a central BIST controller; providing at least one local BIST circuit; and communicating between the central BIST controller and the at least one local BIST circuit.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
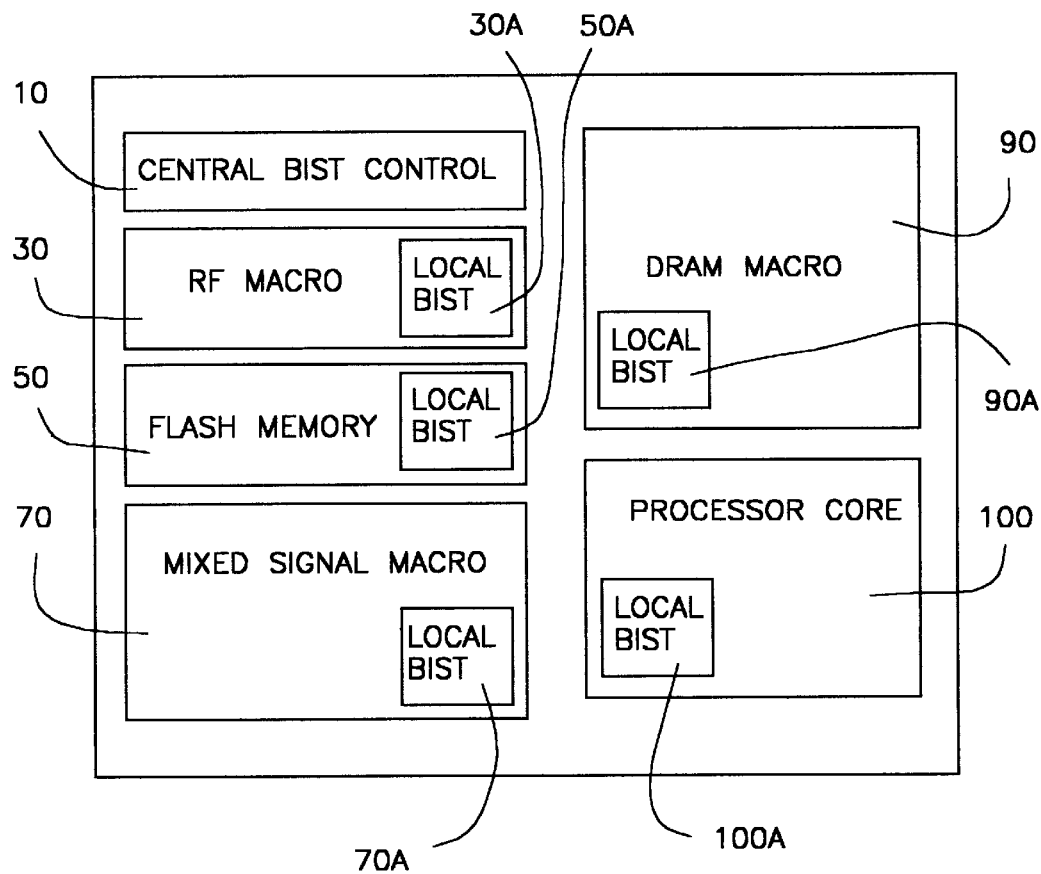
FIG. 1 illustrates a system-on-chip (SOC) design with specific built-in self-test (BIST) units.

FIG. 1 illustrates a system-on-chip (SOC) design with specific built-in self-test (BIST) units. Particularly, the central BIST control unit 10 sends information including address bits and command bits to the local BIST units 30a, 50a, 70a, 90a, 100a of individual macros 30, 50, 70, 90, 100, respectively, and preferably conducts the following tests in a hierarchical manner:

unit tests of radio frequency (RF) macro 30, flash memory macro 50, mixed signal macro 70, dynamic random access memory macro 90, and processor macro 100;

an interface test between processor macro 100 and DRAM macro 80, such as reading data from DRAM to processor, writing data from processor to DRAM, and executing processor testing programs from the DRAM macro;

an interface test between RF macro 30 and external antenna;

an interface test between RF macro 30 and the base-band section of mixed signal macro 70;

a communication test between the flash memory macro 50 and the digital signal processing (DSP) units of mixed signal macro 70, for example, to store information in Flash from DSP, to execute block erasure; and a data transfer performance test between DRAM macro 90 and flash memory macro 50, for example, to exchange data between these two units.

Figure 2:
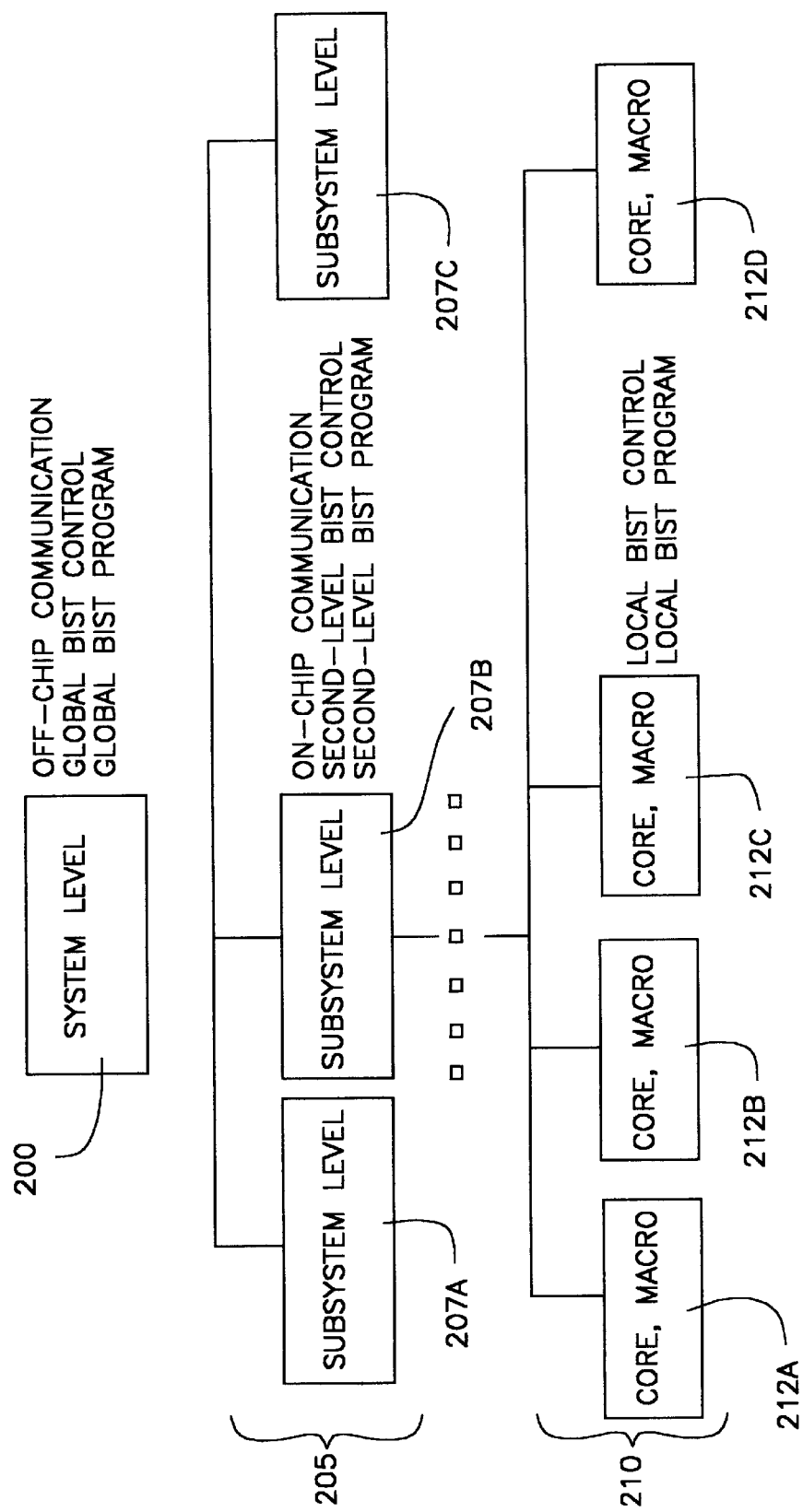
FIG. 2 illustrates a general hierarchical built-in self-test scheme for a system chip and its subsystems.

When the central BIST control unit 10 detects faults that are beyond repair, the test sequence will preferably be stopped immediately, to save testing time. All other reparable faults (if reparable) will preferably be fixed by the local BIST circuits (30a, 50a, 70a, 90a, 100a) and reported to central BIST control unit 10 for further analysis. FIG. 2 illustrates a general hierarchical built-in self-test (BIST) scheme for a system chip and its subsystems. (For example, a laptop system may have subsystems such as multi-media, video, audio, modem, interface, etc.) Particularly, FIG. 2 illustrates a general hierarchy that may be utilized in accordance with at least one presently preferred embodiment of the present invention. As shown, at a global or system level 200, off-chip communication, global BIST control and a global BIST program may be present. At a subsystem level 205 that is one "step" lower in the hierarchy, on the other hand, the functions of on-chip communication, second-level (or intermediate-level) BIST control and second-level (or intermediate-level) BIST programming may be associated with various subsystems at 207a, 207b, 207c, etc. Thence, at a "local" level 210 of the hierarchy, local BIST control and local BIST programming may preferably be associated with various cores or macros at 212a, 212b, 212c, 212d, etc. It should be appreciated in general terms that whereas there is preferably at least one (but typically more than one) sub-system associated with the subsystem "level" 205 that is subordinate to the global system at level 200, there is at least one (but typically more than one) core or macro associated with the local "level" 210 that is subordinate to each subsystem.

In a preferred embodiment of the present invention, each subsystem preferably has a local BIST unit, at a "bottom" or "first" level of the hierarchy, to provide standard test functions such as READ, WRITE, EXECUTE, and RETURN. Such a local BIST unit also preferably provides test functions that are specific to the subsystem in which it resides. For example, the local BIST unit in a DRAM macro may have a pattern generator to generate predefined test patterns for the memory array. The local BIST unit in a processor macro preferably has a program generator to deliver redefined programs for the central processing unit (CPU) core. (Note that the CPU core can also be a DSP unit.) All local BIST circuits are equipped with a common interface to facilitate the communication between the global BIST unit and local BIST units. This communication channel can be a serial bus, parallel bus, or any existing standard bus. If the local BIST circuits do not have a common interface, then a specific interface to each local BIST circuit should preferably be implemented in the global BIST unit to establish a communication channel.

The on-chip communication allows the global BIST unit to perform various control and data transfer operations on the local BIST units. The control operations allow a global BIST unit to start a local BIST, stop a local BIST, or request the status of a local BIST. The data transfer operations allow the global BIST unit to store the test program in a local BIST unit or read the test results from a local BIST. In addition, the on-chip communication allows the global BIST unit to perform control and data transfer operations between two or more local BIST units. For example, the control operations can start more than one local BIST, stop more than one local BIST, or request the status of more than one local BIST. The data transfer operations can store the test program in more than one local BIST unit, read the test results from more than one local BIST, or perform macro-to-macro testing via the designated local BIST units.

One more key feature of a global BIST is its capability to determine whether the local macro is functioning properly according to the design specifications. If not, then the global BIST will preferably replace it with a redundant local unit.

Figure 3:
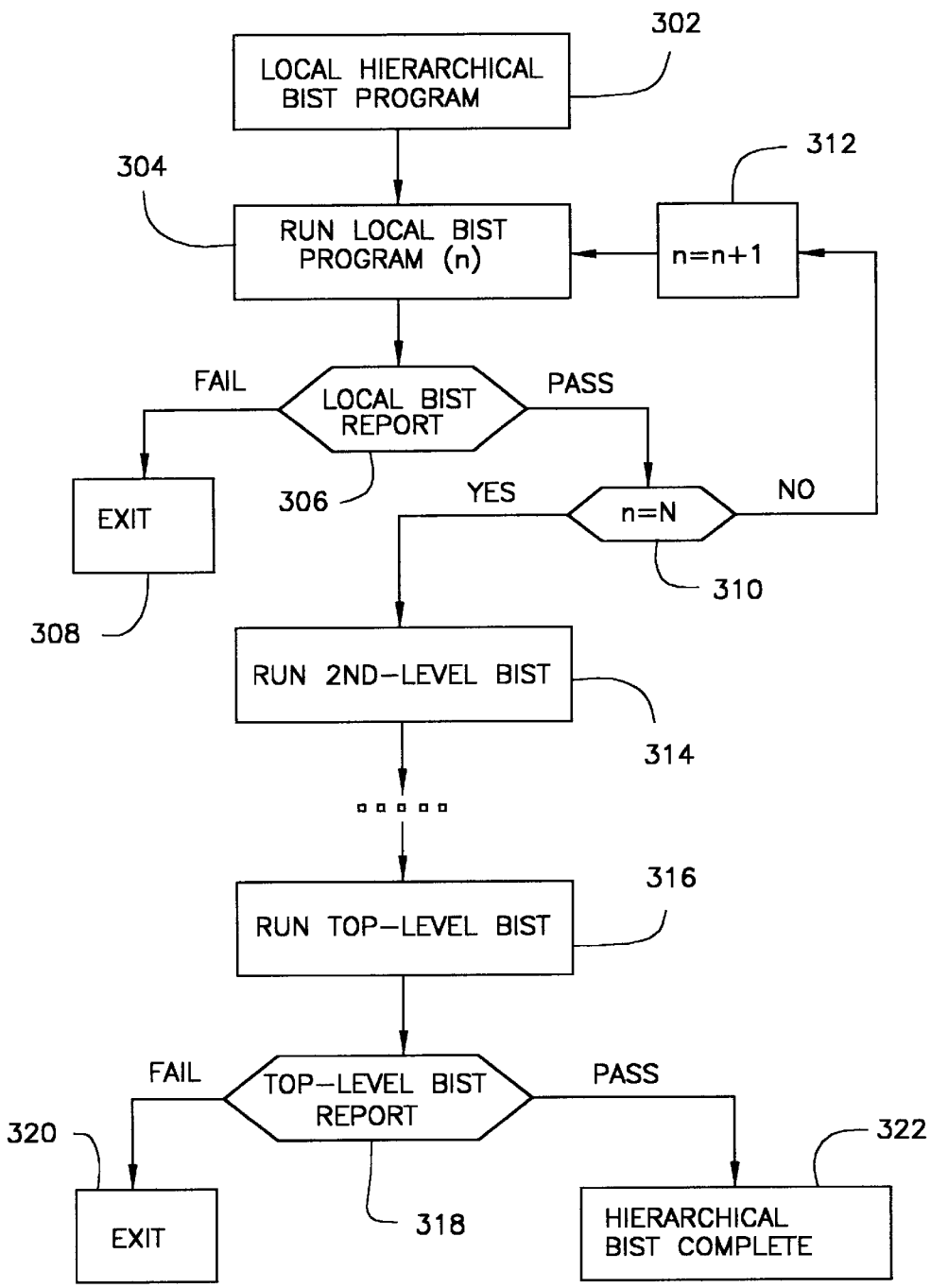
FIG. 3 illustrates a flow of test programs that can be executed by global and local BIST units.

FIG. 3 illustrates a flow of test programs that may be executed by global and local BIST units.

As shown, hierarchical BIST programs are first preferably loaded (302). Local BIST program n is then preferably run (304). Upon failure associated with the corresponding local BIST report (306), the process ends (308). Otherwise, a determination is made (310) as to whether n equals N, the latter representing the entire number of local BIST programs available. If no, n is incremented by 1 (312) and step 304 is revisited. If yes, then a second-level or intermediate level BIST is run at 314. Here, as well, the system BIST will preferably interrogate each BIST from the subsystems sequentially or in another defined order. Finally, the global or top-level BIST is preferably run at 316. Upon failure associated with the top-level BIST report (318), the process ends (320). If "pass", then the hierarchical BIST is considered to be complete at 322. Whereas step 322 corresponds to a successful completion of the process, steps 308 and/or 320 may prompt either a premature termination of the process in the event of an irreparable fault, whereupon an automatic external tester or an operator will be notified to that effect, or the activation of further testing programs or even self-repair programs in the event of a reparable fault.

In accordance with at least one presently preferred embodiment of the present invention, the test programs can be predefined by the global BIST unit or loaded externally via the off-chip communication channel. The test programs for the subsystems can be executed in parallel by the local BIST units to reduce the test time. When a local BIST unit detects an irreparable fault, it is reported to the global BIST unit via the on-chip inter-BIST communication channel. The global BIST unit subsequently terminates the testing and signals failure to the external tester via the off-chip communication channel if there is no extra unit prepared for replacement at global level. On the other hand, if locally reparable faults are detected, multiple test programs such as redundancy activation and performance adjustment can be run on each subsystem. To improve testing efficiency, the test program that provides the highest fault coverage will be executed first. After all the local BIST units successfully execute their respective subsystem testing, the global BIST unit will perform the final system test.

It should be appreciated that the present invention, in accordance with at least one presently preferred embodiment, broadly contemplates a BIST hierarchy that may be composed of two levels, three levels, four levels, or any conceivable number of levels above four. Similar principles would preferably apply in each case as regards the relationship between a BIST of one level and one or more BIST's of an immediately lower level in the hierarchy.

It is to be understood that the present invention, in accordance with at least one presently preferred embodiment, includes a central BIST controller, at least one local BIST circuit, and at least one communication medium provided between the central BIST controller and the at least one local BIST circuit. Together, the central BIST controller, at least one local BIST circuit and at least one communication medium may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for providing hierarchical built-in self-testing for a system-on-chip, said apparatus comprising:
   at least one local BIST circuit associated with a plurality of macros;
   a central BIST controller, wherein said central BIST controller is adapted to control at least one local BIST circuit and said central BIST controller comprises logic which performs a hierarchical test algorithm and said logic is adapted to determine a failure mechanism within each macro and among multiple macros; and
   at least one communication medium provided between said central BIST controller and said at least one local BIST circuit.

2. The apparatus according to claim 1, wherein said central BIST controller comprises storage for hard-coded test commands for each macro.

3. The apparatus according to claim 1, wherein said central BIST controller comprises at least one programmable medium which programs test commands for each macro.

4. The apparatus according to claim 1, wherein said central BIST controller comprises a state machine through which test sequences for each macro are executed.

5. The apparatus according to claim 1, wherein said central BIST controller comprises a processor which processes external test programs.

6. The apparatus according to claim 1, wherein said central BIST controller comprises a temporary memory space which stores data collected from each macro for subsequent external analysis.

7. The apparatus according to claim 6, wherein said temporary memory space comprises a dynamic random access memory.

8. The apparatus according to claim 1, wherein said logic is adapted to perform tests on more than one test level.

9. The apparatus according to claim 8, wherein said logic is adapted to perform at least one higher-level test prior to performing at least one test of a lower level.

10. The apparatus according to claim 1, wherein said logic is adapted to abort a test procedure when a fatal or irreparable failure is detected.

11. The apparatus according to claim 1, wherein said logic is adapted to prompt at least one local BIST circuit to fix a reparable failure in at least one macro.

12. The apparatus according to claim 1, wherein said logic is adapted to initiate testing at a different hierarchical level once a given level of testing is complete.

13. The apparatus according to claim 1, wherein:
   said central BIST controller comprises a temporary memory space which stores data collected from each macro for subsequent external analysis; and
   said logic is adapted to transfer data to said central BIST controller and store data in said temporary memory space after said at least one local BIST circuit completes a final level of resting.

14. The apparatus according to claim 1, wherein said logic is adapted to signal test completion after said at least one local BIST circuit completes final level testing on every macro.

15. The apparatus according to claim 1, wherein said at least one communication medium comprises:
   command and data bits; and
   address bits which direct said command and data bits to at least one specific macro.

16. The apparatus according to claim 1, further comprising at least one predetermined test program transferable to said central BIST controller for programming test commands.

17. The apparatus according to claim 1, wherein said central BIST controller comprises a DSP processor.

18. The apparatus according to claim 1, further comprising at least one redundant local circuit provided for repair purposes.

19. A method of providing hierarchical built-in self-testing for a system-on-chip, said method comprising the steps of:
   providing a central BIST controller, wherein said central BIST controller is adapted to control at least one local BIST circuit;
   providing at least one local BIST circuit;
   providing a plurality of macros associated with said at least one local BIST circuit;
   communicating between said central BIST controller and said at least one local BIST circuit; and
   performing a hierarchical test algorithm which comprises determining a failure mechanism within each macro and among multiple macros.

20. The method according to claim 18, wherein said step of providing a central BIST controller comprises providing storage for hard-coded test commands for each macro.

21. The method according to claim 19, wherein said step of providing a central BIST controller comprises providing at least one programmable medium which programs test commands for each macro.

22. The method according to claim 19, wherein said step of providing a central BIST controller comprises providing a state machine through which test sequences for each macro are executed.

23. The method according to claim 19, wherein said step of providing a central BIST controller comprises providing a processor which processes external test programs.

24. The method according to claim 19, wherein said step of providing a central BIST controller comprises providing a temporary memory space which stores data collected from each macro for subsequent external analysis.

25. The method according to claim 24, wherein step of providing a temporary memory space comprises providing a dynamic random access memory.

26. The method according to claim 19, wherein said step of performing a hierarchical test algorithm comprises performing tests on more than one test level.

27. The method according to claim 26, wherein said step of performing a hierarchical test algorithm comprises performing at least one higher-level test prior to performing at least one test of a lower level.

28. The method according to claim 19, wherein said step of performing a hierarchical test algorithm comprises aborting a test procedure when a fatal or irreparable failure is detected.

29. The method according to claim 19, wherein said step of performing a hierarchical test algorithm comprises prompting at least one local BIST circuit to fix a reparable failure in at least one macro.

30. The method according to claim 19, wherein said step of performing a hierarchical test algorithm comprises initiating testing at a different hierarchical level once a given level of testing is complete.

31. The method according to claim 19, wherein:

said step of providing a central BIST controller comprises providing a temporary memory space which stores data collected from each macro for subsequent external analysis; and said step of performing a hierarchical test algorithm comprises transferring data to said central BIST controller and store data iii said temporary memory space after said at least one local BIST circuit completes a final level of testing.

32. The method according to claim 19, wherein said step of performing a hierarchical test algorithm comprises signaling test completion after said at least one local BIST circuit completes final level testing on every macro.

33. The method according to claim 19, wherein said communicating step comprises:

providing command and data bits; and providing address bits which direct said command and data bits to at least one specific macro.

34. The method according to claim 19, further comprising the step of providing at least one predetermined test program transferable to said central BIST controller for programming test commands.

35. The method according to claim 19, wherein said step of providing a central BIST controller comprises providing a DSP processor.

36. The method according to claim 19, further comprising the step of providing at least one redundant local circuit provided for repair purposes.

37. A program storage device readable by machine, tangibly embodying a program of instructions executable by the machine to perform method steps for providing hierarchical built-in self-testing for a system-on-chip, said method comprising the steps of:

providing a central BIST controller, wherein said central BIST controller is adapted to control at least one local BIST circuit;

providing at least one local BIST circuit;

providing a plurality of macros associated with said at least one local BIST circuit;

communicating between said central BIST controller and said at least one local BIST circuit; and performing a hierarchical test algorithm which comprises determining a failure mechanism with each macro and among multiple macros.

* * * * *